United States Patent [19]

Clark et al.

[11] Patent Number: 5,520,038
[45] Date of Patent: May 28, 1996

[54] DEVICE FOR MANUFACTURING A GROOVE BEARING

[75] Inventors: Wesley R. Clark; David J. Jennings, both of Santa Cruz, Calif.

[73] Assignee: Seagate Technology, Inc., Scotts Valley, Calif.

[21] Appl. No.: 279,194

[22] Filed: Jul. 22, 1994

[51] Int. Cl.⁶ .............................. B21D 15/00; B21D 19/00
[52] U.S. Cl. .................... 72/75; 72/100; 72/113
[58] Field of Search ............................. 72/75, 100, 113; 29/898.02, 898.13, 898.067, 557

[56]  References Cited

U.S. PATENT DOCUMENTS 3,924,434  12/1975  Fulier ............................. 72/75
4,866,966  9/1989  Hagen ............................ 72/113
5,265,334  11/1993  Lucier ........................... 72/100

Primary Examiner—Lowell A. Larson
Assistant Examiner—Rodney Butler
Attorney, Agent, or Firm—Flehr, Hohbach, Test, Albritton & Herbert

[57]  ABSTRACT

A moveable cage which has a pattern of holes surrounding and concentric with a central axis of the cage, and a short hard pin located within the cage, and movable back and forth between the two ends of the cage. A single drive device attached to the cage causes both translation and rotation of the cage. As the cage is advanced and rotated, the interior pin is caused to move backward and forward as the balls roll over the surface of the pin, so that the wear on the balls and on the surface of the interior pin is evenly distributed.

5 Claims, 2 Drawing Sheets 5,520,038

DEVICE FOR MANUFACTURING A GROOVE BEARING

FIELD OF THE INVENTION

This invention relates generally to hydrodynamic groove bearings formed with pumping grooves, and more particularly to a device for manufacturing such a hydrodynamic groove bearing.

BACKGROUND OF THE INVENTION

The present invention relates to a device for manufacturing a groove bearing having a bearing shaft and a bearing bush with cooperating bearing surfaces, of which at least one bearing surface is formed with a pattern of pumping grooves.

A device for forming such grooves has been taught in EPA2292. This device, shown in FIG. 1 hereof, comprises a hard pin around which a cylindrical cage is arranged which has one or more annular patterns of holes arranged symmetrically about the central axis of the cage. These holes are engaged by hard balls having a diameter larger than the wall thickness of the cage. The cage and the pin or sleeve are each coupled to a drive arrangement capable of impressing a translation and a rotation upon the cage and the pin or sleeve. Thus, the cage and pin or sleeve are separately translated and/or rotated in order to form the grooves in the surface of the bearing wall. According to the patent owner's own later filed U.S. Pat. No. 5,265,334, it has been found that in carrying out the prior art method the pin or sleeve of the prior art device is subjected to substantial wear as a result of large Hertzian stresses produced at the contact surfaces between the pin or sleeve and the balls. The wear particularly causes deformations of the pin or sleeve surfaces surrounding and facing the cage, so that the contact surface of the pin or sleeve becomes irregular resulting in inaccurate groove depth. Therefore, this same U.S. Pat. No. 5,265,334 disclosed an improvement thereof shown in FIG. 2 of the present application in which the bearing surface of the bearing part (which may be a pin or sleeve) includes a continuous groove which is concentric with the central axis of the pin or sleeve, the groove extending in a longitudinal sectional plane of the pin or sleeve which contains the central axis. However, this also results in continuous wear of a single portion of the surface of the pin resulting in an unnecessarily short life for the device for making grooves.

SUMMARY OF THE INVENTION

It is an object of the present invention to improve upon the known devices for forming grooves for a hydrodynamic bearing to minimize the wear.

It is a further objective of the present invention to provide a device which simplifies making grooves for hydrodynamic bearings which are regularly spaced and have a consistent depth. To this end, the device in accordance with the present invention is characterized by a cage which has a pattern of holes surrounding and concentric with a central axis of the cage, and a short hard pin located within the cage, and movable back and forth between the two ends of the cage. A single drive device attached to the cage causes both translation and rotation of the cage. As the cage is advanced and rotated, the interior pin is caused to move backward and forward as the balls roll over the surface of the pin, so that the wear on the balls and on the surface of the interior pin is evenly distributed. In this way, the life of the groove making device is prolonged, and the depth of the grooves being formed is consistent. In other words, as the cage is driven, in a primary mode, the pin performs exclusively secondary movements derived from the movement of the cage and the rolling of the balls over the surface to the groove, ensuring a favorable constant rolling movement of the balls.

BRIEF DESCRIPTION OF THE DRAWINGS

The invention will now be described in further detail by way of example with reference to the drawings in which.

DETAILED DESCRIPTION OF A PREFERRED EMBODIMENT

Figure 3A:
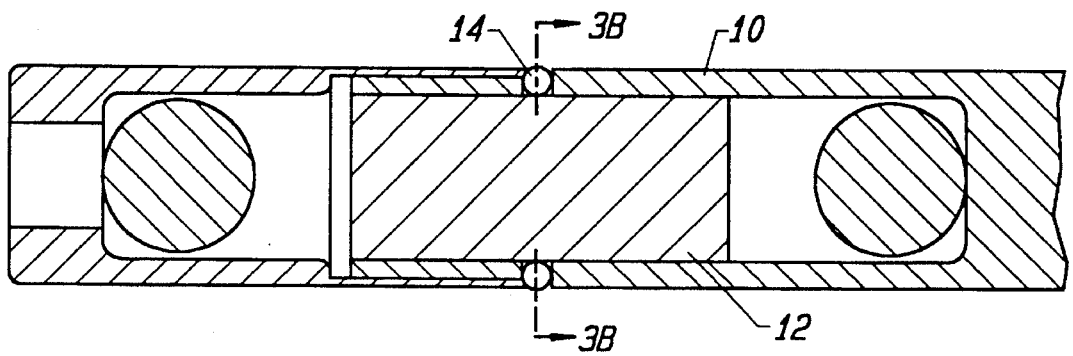
FIG. 3A is a diagrammatic sectional view of a device in accordance with the present invention for forming grooves in a hydrodynamic bearing.
Figure 3B:
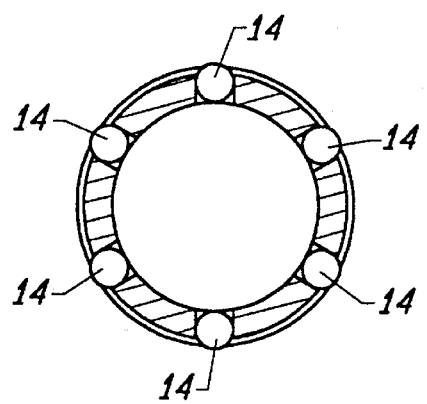
FIG. 3B is a sectional view taken along the line B—B of the device shown in FIG. 3A.
Figure 3C:
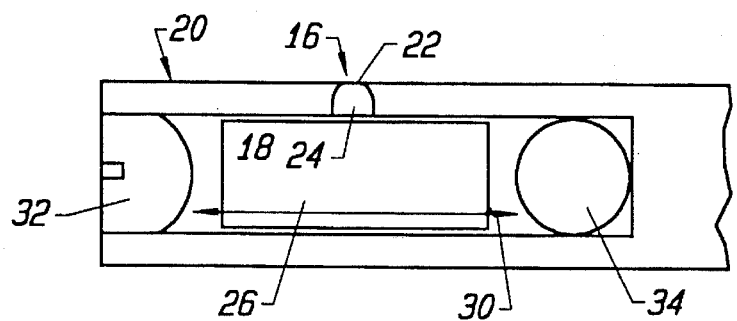
FIG. 3C is a diagrammatic sectional view of an alternate embodiment of the invention.

Turning specifically to FIG. 3A, the device of the present invention for forming the grooves comprises a cylindrical cage 10, a bearing pin 12, and a plurality of hardened isostatically compressed metal balls 14 arranged in the cage 10. Balls 14 are specifically engaged in holes 16 (see FIG. 3C) in an annular pattern which is symmetrical about the central axis (as shown in FIG. 3B). The holes 16 are formed by electroerosion from the inner surface 18 toward the outer surface 20 of the cage 10 so that at the outer surface 20, the edges of the holes have a smaller diameter or opening 22 than the opening 24 at the inner surface. In this way, the hardened balls which are to be used to form the grooves are captured within the holes 14 and held in place with only the end surface of the ball exposed to form the groove.

After the balls are inserted in the cage, a pin of a hardened material 26 which is of a length less than the overall length of the channel 30 formed in the interior of the device is inserted. The hardened pin, which is preferably of a carbide material so that the balls may roll over the surface of the pin for a long period of time without pitting or marring or otherwise wearing away the surface, is also longer than the distance from either end stopper 32, 34 of the device to the point near the center of the device where the concentric row of balls 14 is located. By choosing a pin of this length, when the cage is coupled to a drive means which is not shown, and which is capable of impressing a translational and rotational movement on the cage, the balls also engage the surface of the pin 26 and provide a secondary movement to the pin. In this way, the wear of having the balls pressed against the surface of the pin is distributed over the surface of the pin as the primary movement of the cage creates a secondary movement of the pin.

To form grooves, the device comprising the pin, the cage and the balls is translated and rotated through the bearing bush 1, thereby causing bearing grooves to be formed in the softer material of the bearing bush 1. The number of helical bearing grooves formed corresponds to the number of balls used. The pitch of these grooves depends on the ratio between the translational velocity $V_k$ and the rotational velocity $\omega_k$ of the cage 10. By varying this ratio, grooves of varying pitch can be obtained. To form a herringbone pattern which is typical of hydrodynamic bearings, the direction of rotation may be reversed after completing a specific distance of travel.

As noted above, in the situation illustrated in FIG. 3, the cage 10 is driven imparting the secondary movement to the pin 26 and causing rotation of the balls 14. Alternatively, it is possible to move the bearing bush 1, and create only secondary movement of the balls 14 and the pin 26 with the cage being held stationary. It should further be noted that there are alternative ways of forming and assembling the cage and device, two of which appear in FIGS. 3A and 3C. For example, it may be desirable to form the empty cage, and place a large spherical hard carbide ball at one end. The pin 26 is then inserted, and the opposite end closed after the insertion of a second ball. In this way, the distance between the location of the concentric line of groove forming ball and the end of the cage is easily defined to be less than the length of the pin, although a pin of any length may be used and the pin and balls may be easily replaced. An alternative approach appears in FIG. 3C where a hardened ball 34 is placed at one end of the chamber defined in the cage, and a second end is defined by a screw threaded stopper 32. In this way also, replacement of the pin 26 and/or the balls 14 as wear occurs for either of these two elements of the device is easily provided for.

Figure 1:
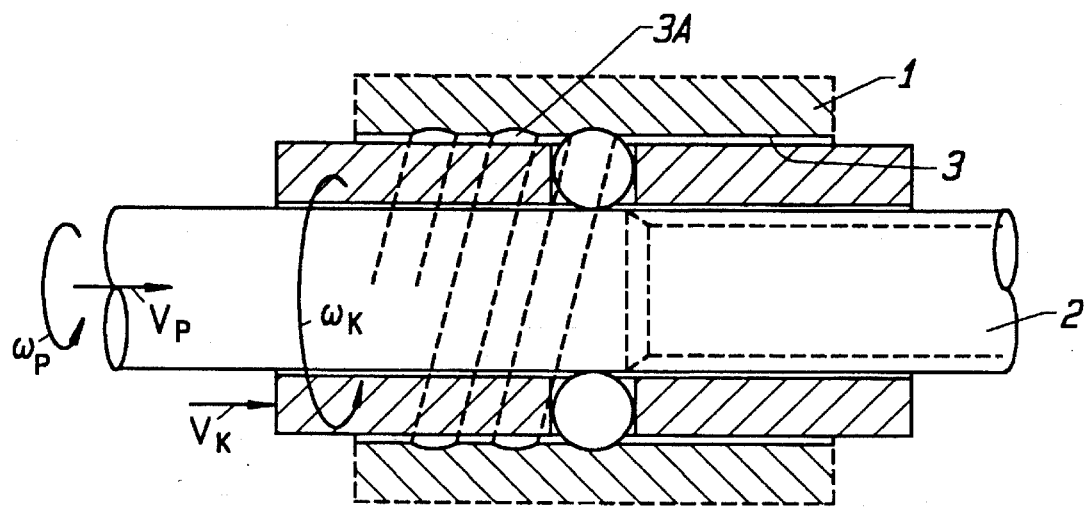
FIG. 1 is a diagrammatic drawing of a prior art device used to form grooves in a hydrodynamic bearing surface.
Figure 2:
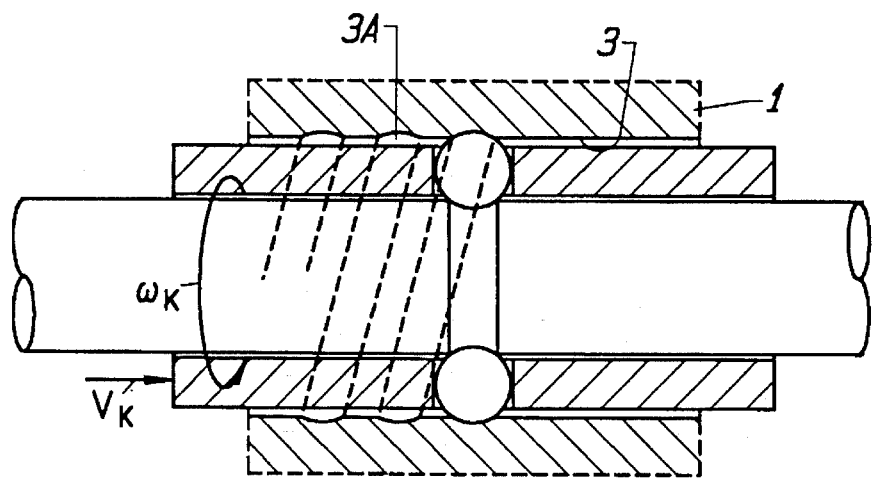
FIG. 2 is a depiction of a further prior art device for forming grooves in a surface of a bearing to be formed.

In FIGS. 1 and 2, the reference 1 denotes a bearing bush of a hydrodynamic bearing whose inner surface 3 should be formed with a groove pattern 3A. The bearing bush in these, as well as in the preferred embodiment of the present invention, is immobilized by means not shown; as an alternative, the groove forming device of the present invention shown in FIG. 3A, 3B and 3C could be immobilized and drive means attached to the bearing bush 1 to translate and rotate that part.

It is to be noted that the invention is not limited to the embodiments disclosed herein. Alternatives may occur to a person of skill in the art who studies the present invention disclosure whereby the scope of the present invention is to be limited only by the following claims.

What is claimed is:

1. An apparatus for manufacturing grooves in the surface of a bearing part on which said grooves are to be formed, the apparatus comprising a cage having a circular cage wall with a predetermined wall thickness and an annular pattern of holes in said wall;

a plurality of spherical balls each rotatably disposed in a respective hole of said annular pattern of holes in said cage wall, each of said balls having a diameter greater than said wall thickness and further having a diameter greater than a diameter of said respective hole in which said ball is disposed so that said ball cannot pass through said hole; and a pin located within said cage and having a length less than the interior opening between interior ends of said cage so that as the cage is rotated and translated relative to the bearing part on which grooves are to be formed, said balls protruding through said cage wall engage with said surface of said bearing, so that said balls smoothly roll in said holes in said cage and axially couple said surface of said bearing part being grooved to said hardened pin whereby with primary movement of said cage, the rolling of said balls causes a secondary movement to be imparted to said pin whereby said hardened balls are constantly maintained in groove forming contact with said surface of said bearing part.

2. An apparatus as claimed in claim 1 wherein said holes in said cage in which said spherical balls are located have a lesser diameter at an outer surface of said cage wall than at an inner surface of said cage wall in order to capture said balls within said holes.

3. An apparatus as claimed in claim 1 wherein the balls are engaged in said holes in said annular pattern which is symmetrical about a central axis of said cage.

4. An apparatus as claimed in claim 2 wherein said holes are generally spherical in shape although a crown portion of said generally spherical shape is truncated to allow for protrusion of said balls through said cage wall.

5. An apparatus according to claim 4 wherein said pin has a length greater than a distance from an axial location of said circular row of balls to said either end of said cage.

* * * * *